(12) United States Patent
Xiang

(10) Patent No.: US 7,920,863 B2
(45) Date of Patent: Apr. 5, 2011

(54) METHOD AND SYSTEM FOR MANAGING NETWORK RESOURCES

(75) Inventor: Zhixian Xiang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1153 days.

(21) Appl. No.: 11/508,014

(22) Filed: Aug. 21, 2006

(65) Prior Publication Data

US 2007/0064903 A1    Mar. 22, 2007

Related U.S. Application Data

(60) Provisional application No. 60/710,422, filed on Aug. 22, 2005.

(51) Int. Cl.
H04W 88/02 (2009.01)
(52) U.S. Cl. .................................................. 455/435.1
(58) Field of Classification Search .................. 370/338, 370/337, 351, 352, 328, 356; 710/313; 455/436, 455/437, 435.1; 709/227, 228; 726/14
See application file for complete search history.

(56) References Cited

U.S. PATENT DOCUMENTS

| | | | |
|---|---|---|---|
| 6,769,000 B1 * | 7/2004 | Akhtar et al. | 707/103 R |
| 7,079,499 B1 * | 7/2006 | Akhtar et al. | 370/310 |
| 7,558,844 B1 * | 7/2009 | Heidelberger et al. | 709/220 |
| 7,633,904 B2 | 12/2009 | Venkatachalam | |
| 7,756,468 B2 | 7/2010 | Kojima | |
| 2002/0082012 A1 | 6/2002 | Wang et al. | |
| 2002/0164983 A1 * | 11/2002 | Raviv et al. | 455/432 |
| 2004/0002337 A1 | 1/2004 | Wheeler et al. | |
| 2006/0099973 A1 * | 5/2006 | Nair et al. | 455/461 |
| 2007/0189201 A1 | 8/2007 | Feder et al. | |
| 2008/0082642 A1 * | 4/2008 | Wu | 709/222 |
| 2008/0084842 A1 * | 4/2008 | Xiang et al. | 370/329 |

OTHER PUBLICATIONS

"WiMAX Forum Network Architecture," Stage 3: Detailed Protocols and Procedures, Release 1.1.1, Sep. 14, 2007, 536 pages.

IEEE Standard 802.16e, "Part 16: Air Interface for Fixed and Mobile Broadband Wireless Access Systems, Amendment 2: Physical and Medium Access Control Layers for Combined Fixed and Mobile Operation in Licensed Bands and Corrigendum 1," IEEE Computer Society and the IEEE Microwave Theory and Techniques Society, Feb. 28, 2006, 864 pages.

* cited by examiner

Primary Examiner — Diane Mizrahi
(74) Attorney, Agent, or Firm — Slater & Matsil, L.L.P.

(57) ABSTRACT

Method a system for managing network resources. According to an embodiment, the present invention provides a method for managing resource in a wireless network. As an example, the wireless network includes an access network and a home network. The access network provides at least radio connectivity and the home network provides at least internet protocol connectivity. The method includes a step for providing a network access to a mobile station by the access network. For example, the network access includes a network connection between the mobile station and the home network. The method also includes a step for receiving information associated with a lifetime for the network access from the mobile station by the access network and by the home network. The method additionally includes a step for storing the information associated with the lifetime by the access network and by the home network.

8 Claims, 7 Drawing Sheets

METHOD AND SYSTEM FOR MANAGING NETWORK RESOURCES

CROSS-REFERENCES TO RELATED APPLICATIONS

This application claims priority to U.S. Provisional Application No. 60/710,422 filed Aug. 22, 2005, which is incorporated by reference herein.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates in general to telecommunication techniques. More particularly, the invention provides a method and system for managing network resources. In a specific embodiment, the present invention provides a method and system for an access network to independently (i.e., without negotiating with connectivity service network and/or the mobile station) terminate connections to a mobile station based on certain predetermined conditions. Merely by way of example, the invention is described as it applies to wireless access network and content provider, but it should be recognized that the invention has a broader range of applicability.

Techniques for wireless communications have progressed through the years. For example, satellite wireless communication networks have been developed where satellites are use to relay voice communication among wireless. There are other techniques as well. Over the recent years, the "cellular" wireless communication networks have become one of the most widely used technique for providing wireless communication.

A wireless network usually includes base stations and mobile stations. For example, a mobile station (MS) refers to a station that is to be used while in motion or during halts at unspecified geographic locations. As an example, the mobile station is a mobile communication device. In another example, the mobile station is a cellular phone. In yet another example, a base station (BS) refers to a set of equipment that can provide connectivity, management, and control for one or more mobile stations. As merely an example, a connective service network refers to a set of network functions that provide IP connectivity services to mobile stations. In an exemplary process flow, a MS obtains radio access from a BS. Through the BS, the MS obtains IP services.

When a mobile station is connected to the network, the mobile station may loose its connection with the network due a variety of reasons (e.g., the mobile station moves into a building where radio signals are blocked, the mobile station freezes, etc.). For these situations, it is often desirable to terminate the connection between the mobile station and the network. In the past, various conventional techniques have been developed for terminating connection when mobile station is no longer properly connected to the network. Unfortunately, these conventional techniques are often inadequate.

Therefore, an improved method for providing wireless communication network is desired.

BRIEF SUMMARY OF THE INVENTION

The present invention relates in general to telecommunication techniques. More particularly, the invention provides a method and system for managing network resources. In a specific embodiment, the present invention provides a method and system for an access network to independently (i.e., without negotiating with connectivity service network and/or the mobile station) terminate connections to a mobile station based on certain predetermined conditions. Merely by way of example, the invention is described as it applies to wireless access network and content provider, but it should be recognized that the invention has a broader range of applicability.

According to an embodiment, the present invention provides a method for managing resource in a wireless network. As an example, the wireless network includes an access network and a home network. The access network provides at least radio connectivity and the home network provides at least internet protocol connectivity. The method includes a step for providing a network access to a mobile station by the access network. For example, the network access includes a network connection between the mobile station and the home network. The method also includes a step for receiving information associated with a lifetime for the network access from the mobile station by the access network and by the home network. The method additionally includes a step for storing the information associated with the lifetime by the access network and by the home network. The method further includes a step for initiating a first termination process for the network connection by the home network if the lifetime expires. Additionally, the method includes a step for initiating a second termination process for the network connection by the mobile station if the lifetime expires. Also, the method includes a step for initiating a third termination process for the network connection by the access network if the lifetime expires. The process for initiating the third termination process is performed without the access network communicating with the home network about the third termination process.

According to another embodiment, the present invention provides an access network system for a wireless communication network. The system includes a first communication interface. As an example, the first communication interface is configured to wirelessly connect to one or more mobile stations. The system also includes a second communication interface. For example, the second communication interface is configured to connect to a home agent. The system also includes a logic component. According to an embodiment, the logic component is configured to store and determine one or more network policies associated with the one or more mobile stations. The system further includes a gateway component that is configured to store and to track at least one lifetime. For example, the lifetime is associated with at least one mobile station. The first communication interface is configured to receive information associated with at least one lifetime from the at least one mobile station. The gateway component is configured to terminate a network connection for the at least one mobile station if the lifetime expires.

According to yet another embodiment, the present invention provides a telecommunication system for wireless access. The telecommunication system includes a mobile station that is configured to send registration messages at predetermined time intervals. For example, each of the registration messages includes a lifetime, and the registration messages include a first registration message, and the first registration message including a first lifetime. The system also includes an access service network that is configured to provide a network access to the mobile station and to wirelessly receive the registration messages from the mobile station. According to certain embodiments, the access service network includes a base station that is configured to provide a radio access to the mobile station. The access service network further includes a gateway that is configured to forward the registration messages and store at least the first lifetime. In addition, the system includes a connectivity service network that is configured to receive the registration messages and store at least the first lifetime. For example, the connectivity service network is configured to allocate a network resource for the mobile station in response to the registration messages. The gateway is configured to cause the access service network to stop providing the network access to the mobile station if the first lifetime expires before a second registration message is received from the mobile station. For example, the second registration message includes at least a second lifetime. The connectivity service network is configured to independently deallocates the allocated network resource for the mobile station if the first lifetime expires before the second registration message is received from the mobile station.

It is to be appreciated that the various embodiments of the present invention provide advantages over conventional techniques. In various embodiments, the present invention allows valuable network resources to be allocated for better use. For example, an access network is able to terminate a network connection to a mobile station independently and effectively. In addition, various embodiments of the present invention are compatible with conventional techniques and easily implemented. There are other benefits as well.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a method and system for managing network resources. In a specific embodiment, the present invention provides a method and system for an access network to independently (i.e., without negotiating with connectivity service network and/or the mobile station) terminate connections to a mobile station based on certain predetermined conditions. Merely by way of example, the invention is described as it applies to wireless access network and content provider, but it should be recognized that the invention has a broader range of applicability.

Figure 1:
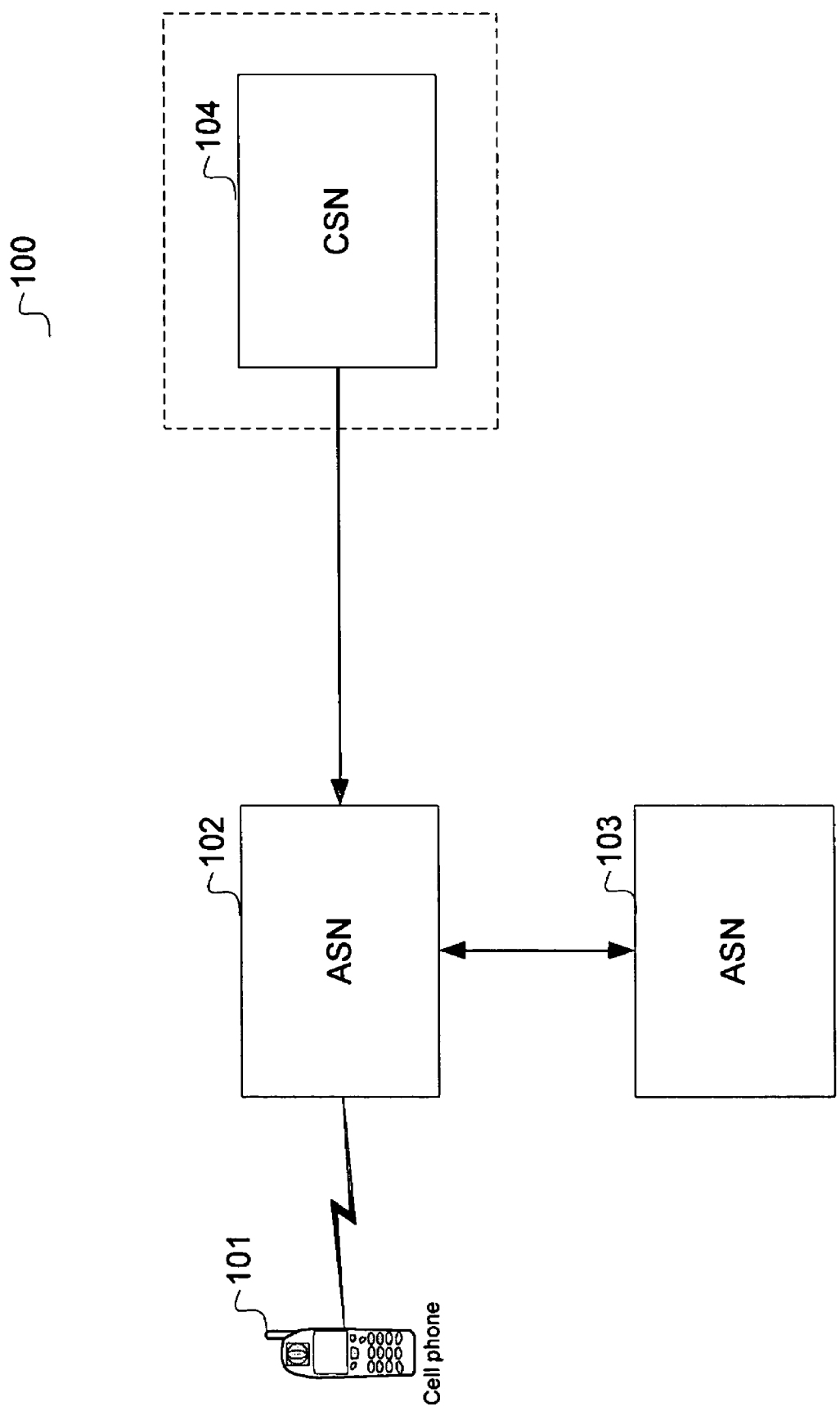
FIG. 1 is a simplified diagram illustrating a conventional telecommunication network.

In a telecommunication network, a mobile station is typically connected to a local network, which provides, among other things, radio connectivity. The local network also establishes a connection between the mobile station and a network where a variety of services (e.g., routing, Internet protocol routing, etc.) are provided. FIG. 1 is a simplified diagram illustrating a conventional telecommunication network. As an example, the conventional telecommunication network 100 as illustrated in FIG. 1 complies with WiMAX wireless (i.e., IEEE802.16d/e) networks.

In the, a mobile station 101, which is sometimes referred to as mobile subscriber station when the mobile station is subscribed to a specific network service provider, is connected to an access service network. For example, the mobile station 101 is connected to the access service network (ASN) 102. For example, the ASN 102 is configured to provide radio access to the mobile station 101. According to an embodiment, the ASN 102 includes a base station (BS) for providing radio access. For example, the BS refers to a generalized equipment set for providing connectivity, management, and control of mobile stations. In addition, the ASN 102 includes a gateway for interfacing with other networks. For example, the gateway allows the mobile station 101 to communicate with other ASNs. As another example, the gateway allows the mobile station 101 to connect to a connectivity service network (CSN) 104. As an example, the connectivity service network refers to a set of network functions that provide, among other things, IP connectivity service to mobile stations. Often, the CSNs also store policies associated with mobile stations.

Typically, a mobile station connects to a CSN that stores the network policies associated with the mobile station through an ASN. As an example, the CSN is often referred as network service provider from a management perspective. Similarly, the ASN is often referred to as network access provider from a management perspective. Typically, the ASN that the mobile station connects to is referred as a foreign agent. For example, "foreign agent" refers to a router on a mobile node's visited network which provides routing services to the mobile node while registered. As an example, the foreign agent de-tunnels and delivers datagram to the mobile node that were tunneled by the mobile node's home agent. For datagram sent by a mobile node, the foreign agent may also serve as a default router for registered mobile nodes. The home network for the mobile station is often referred as "home agent". For example, home agent refers to a router on a mobile node's home network which tunnels datagram for delivery to the mobile node when it is away from home. In addition, a home agent sometimes maintains current location information for the mobile node. As an example, the CSN 104 in FIG. 1 may be characterized as a home agent.

As described above, a CSN typically performs a variety of network functions, many of which are associated with network policies associated with certain subscribers. As an example, the CSN determines an amount of network bandwidth to be used for a mobile station. In certain network environment, the CSN is equipped with authentication, authorization, and accounting (AAA) functionalities. As an example, AAA refers to a framework, based on IETF protocols such as RADIUS or DIAMETER, that specifies the protocols and procedures for authentication, authorization, and accounting associated with the user, the mobile station, and subscribed services across different access technologies. For example, AAA includes mechanisms for secure exchange and distribution of authentication credentials and session keys for data encryption.

Figure 2:
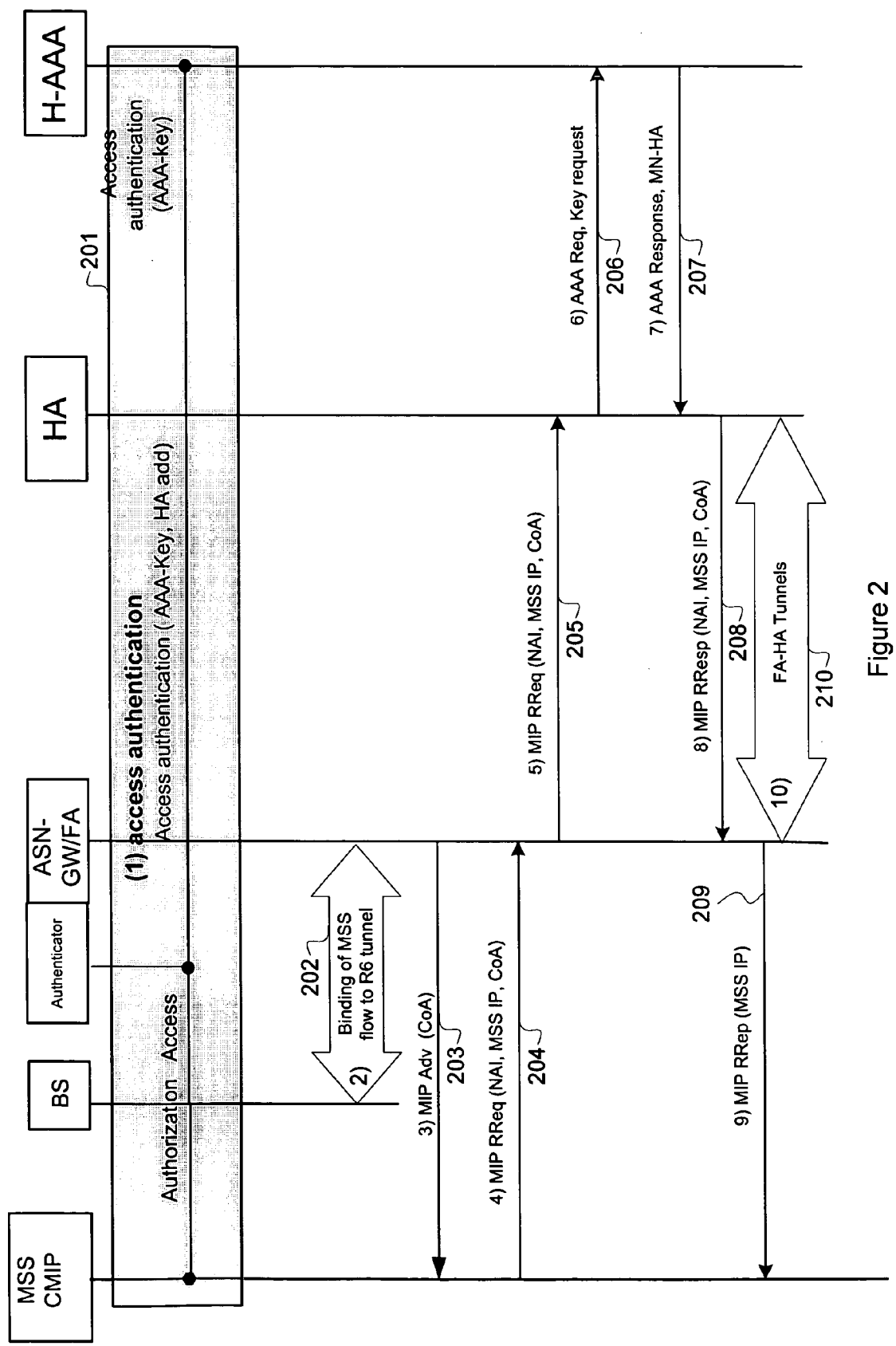
FIG. 2 is a simplified diagram illustrating operation of a conventional telecommunication network.

FIG. 2 is a simplified diagram illustrating operation of a conventional telecommunication network. As an example, the conventional telecommunication network is the same as the telecommunication network 100 in FIG. 2.

At step 201, a mobile station connects to the telecommunication network. As an example, the mobile station connects to a base station of the ASN. Typically, an gate way of the ASN determines whether the mobile station is authorized for access. Through the ASN, the mobile station connects to a home agent CSN, where various functions of the AAA is performed. For example, during an access level authentication the, AAA authentication key is retrieved from the AAA access authentication message obtained from a mobile station home AAA server.

At step 202, a trigger is generated when binding of mobile flow with the CSN data tunnel is established. For example, the CSN allocates a data tunnel based on the an access profile stored at the CSN.

At step 203, the CSN sends one or more messages to the mobile station. For example, one of the messages includes a request for mobile Internet protocol (MIP) registration.

At step 204, the mobile station sends an MIP registration message to the ASN. Depending upon application, the MIP registration messages is compliant to various standards. Among other things, the MIP registration message includes unique identifier for the mobile station. For example, the mobile station that uses MIP connectivity does not issue a DHCP request and only uses MIP signaling to obtain its home address. In an IP host configuration, the MSS uses a Normal Vendor/Organization Specific Extension in the MIP Registration Request (e.g., often referred as RFC3115 according to industry standards) to obtain its IP host configuration.

At step 205, the MIP registration message is forwarded from the ASN to the CSN. As an example, the ASN modifies the MIP registration message before forwarding it to the CSN.

At step 206, an access request is sent from the CSN to an AAA server. For example, a RADIUS Access-Request message is sent from a HA containing the MN-HA attribute.

At step 207, the AAA server determines whether to grant access and the AAA server returns an AAA response message to the CSN. For example, a RADIUS server sends a RADIUS Access-Accept message containing the encrypted MN-HA shared key. If registration request includes dynamic HA assignment and IP host configuration, the HA address and the IP configuration are respectively returned by the AAA.

At step 208, the CSN forwards the response to the ASN. For example, the home agent CSN forwards a MIP request response to the foreign agent ASN.

At step 209, the response message is forwarded from the ASN to the mobile station. For example, the response message contains, among other things, a mobile station home address.

At step 210, an MIP tunnel is established between the ASN and the CSN. For example, the MIP tunnel is used to exchange data between the ASN and CSN for the mobile station.

Usually, to keep the MIP connection always on, the mobile station needs to periodically conduct MIP renew process. For example, the renew process involves sending MIP registration message to a HA CSN before an MIP lifetime expires.

Figure 3:
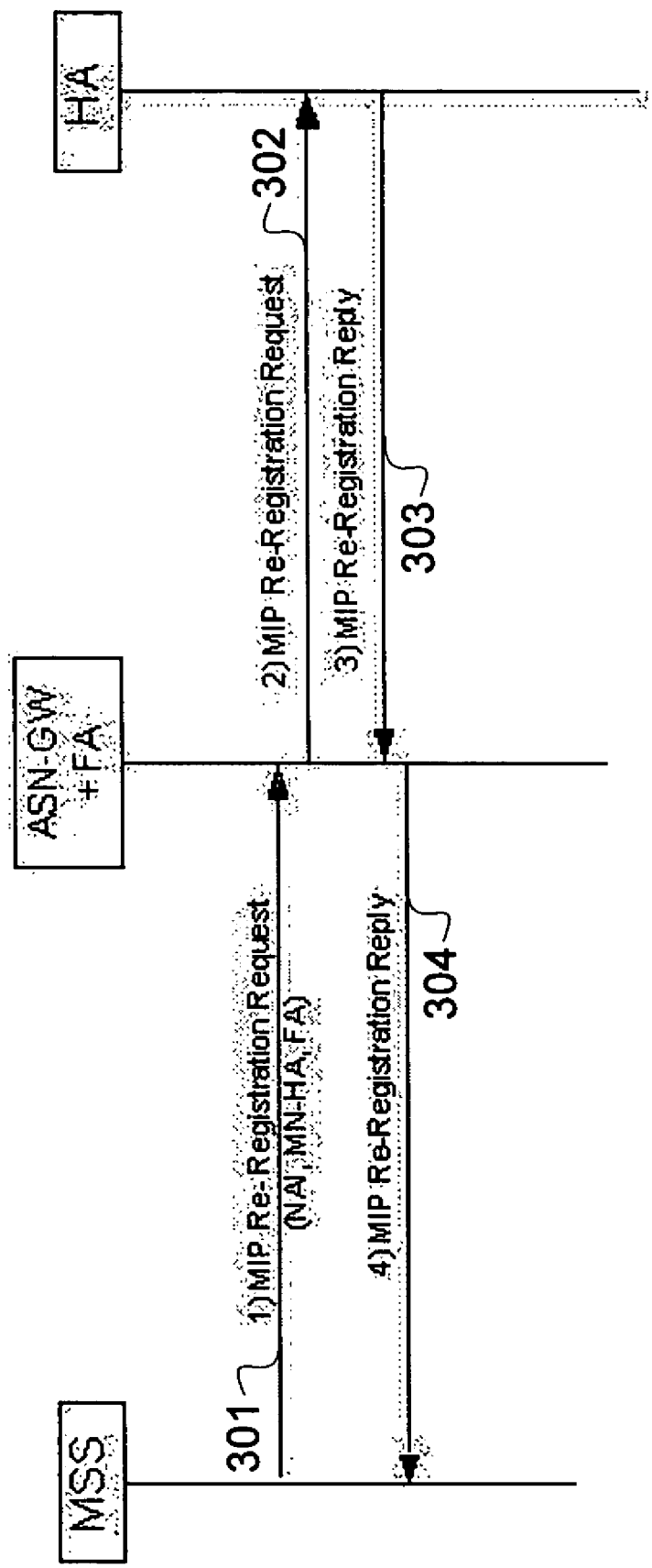
FIG. 3 is a simplified diagram illustrating a conventional renew process for mobile connection.

FIG. 3 is a simplified diagram illustrating a conventional renew process for mobile connection. At step 301, a connected mobile station sends an MIP re-registration request to the foreign agent ASN. At step 302, the ASN forward the request to a home agent CSN. At step 303, the home agent CSN sends an MIP re-registration reply to the ASN. At step 304, the ASN forward the MIP re-registration reply to the mobile station.

Figure 4:
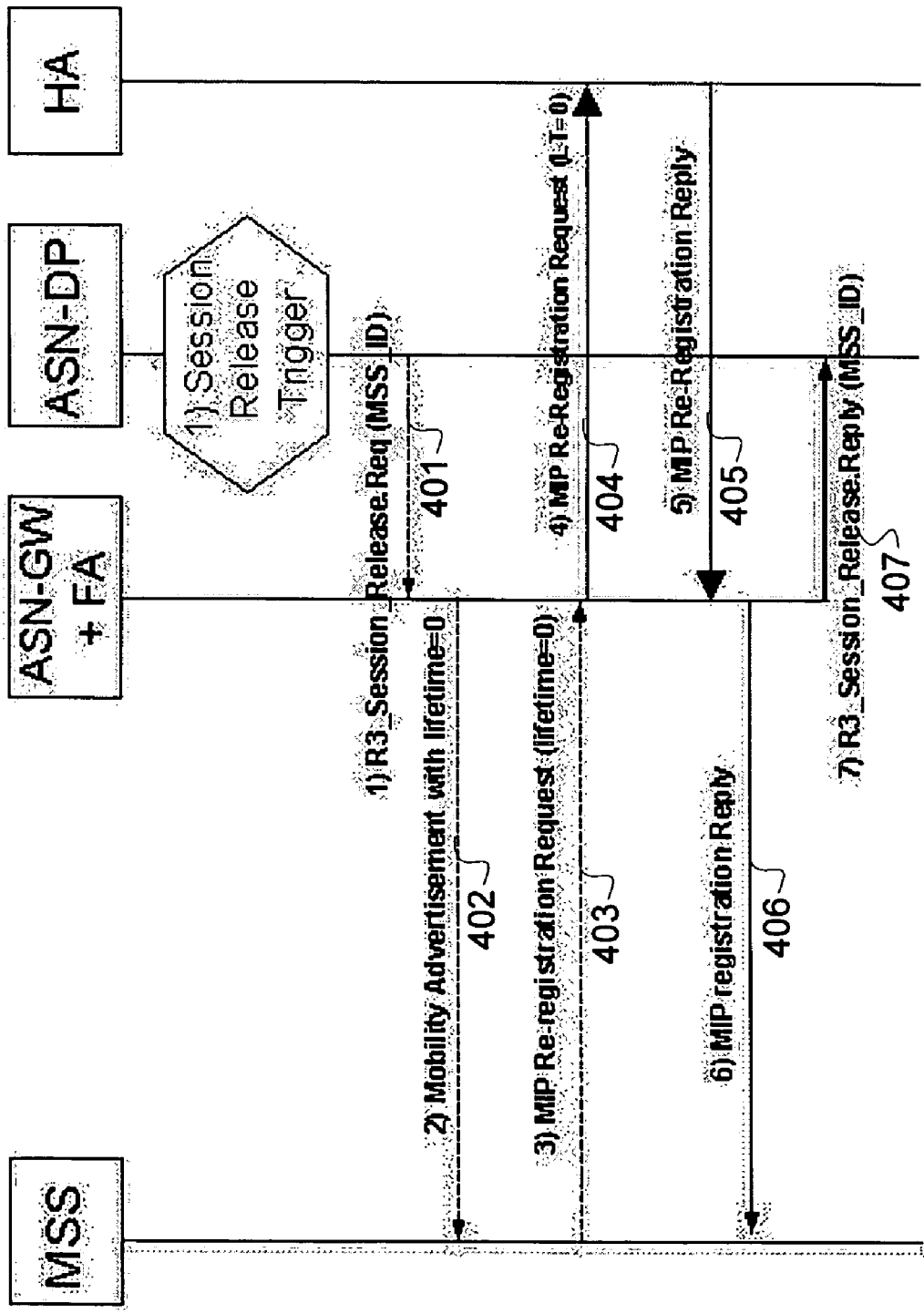
FIG. 4 is a simplified diagram illustrating a conventional termination process for a mobile station.

FIG. 4 is a simplified diagram illustrating a conventional termination process for a mobile station. For example, the termination process is applied in a WiMAX network architecture design, which only provides one network initiated termination as shown in FIG. 4.

At step 401, a session release is triggered by a decision point at the ASN and the. decision point sends a session release request to the gateway of the ASN. For example, the decision point is a logic component implemented by a digital logic unit.

At step 402, the gateway forward the session release request to the mobile station. For example, the gateway forward the session release request over the air.

At step 403, the mobile station sends a message for terminating registration. For example, the message includes a MIP re-registration request with an identifier associated with the mobile station and a lifetime of zero (i.e., connection no longer needed). As an example, the mobile determines that connection to the network is no longer needed and requests connection to be terminated by indicating that the lifetime is zero.

At step 404, the ASN forward the message from the mobile station to the home agent CSN. For example, the message includes an indication that the lifetime is zero so that the CSN would terminate the connection.

At step 405, the home agent CSN sends an MIP re-registration reply message indicating that the mobile station is to be disconnected from the network. For example, the message is sent to the ASN.

At step 406, the ASN forward the MIP re-registration reply message to the mobile station. For example, the MIP re-registration reply message confirms the termination of connection for the mobile station.

At step 407, the gateway of the ASN sends a connection release reply message to the decision point. As an example, the reply message from the ASN informs the decision point that the mobile station is being disconnected from the network and network resource may be freed.

As can be seen in FIG. 4, the convention termination process is inadequate for many applications. For example, the termination process assumes that the mobile station is reachable. In reality, that is often not the case. For example, when the mobile station moves to an area without WiMAX coverage for a while, there is often no way for network to detect that the mobile station is no long connected, and thus it is useless to send control messages to the mobile station.

It is to be appreciated various embodiments of the present invention provides an improved method for terminating network connection for mobile stations. For example, an embodiment of the present invention allows the certain components of an ASN to independently terminate connection for mobile stations. It is to be appreciated that certain embodiments of the present invention allows the network to determine if a mobile station is disconnected from the network without information the network.

Figure 5:
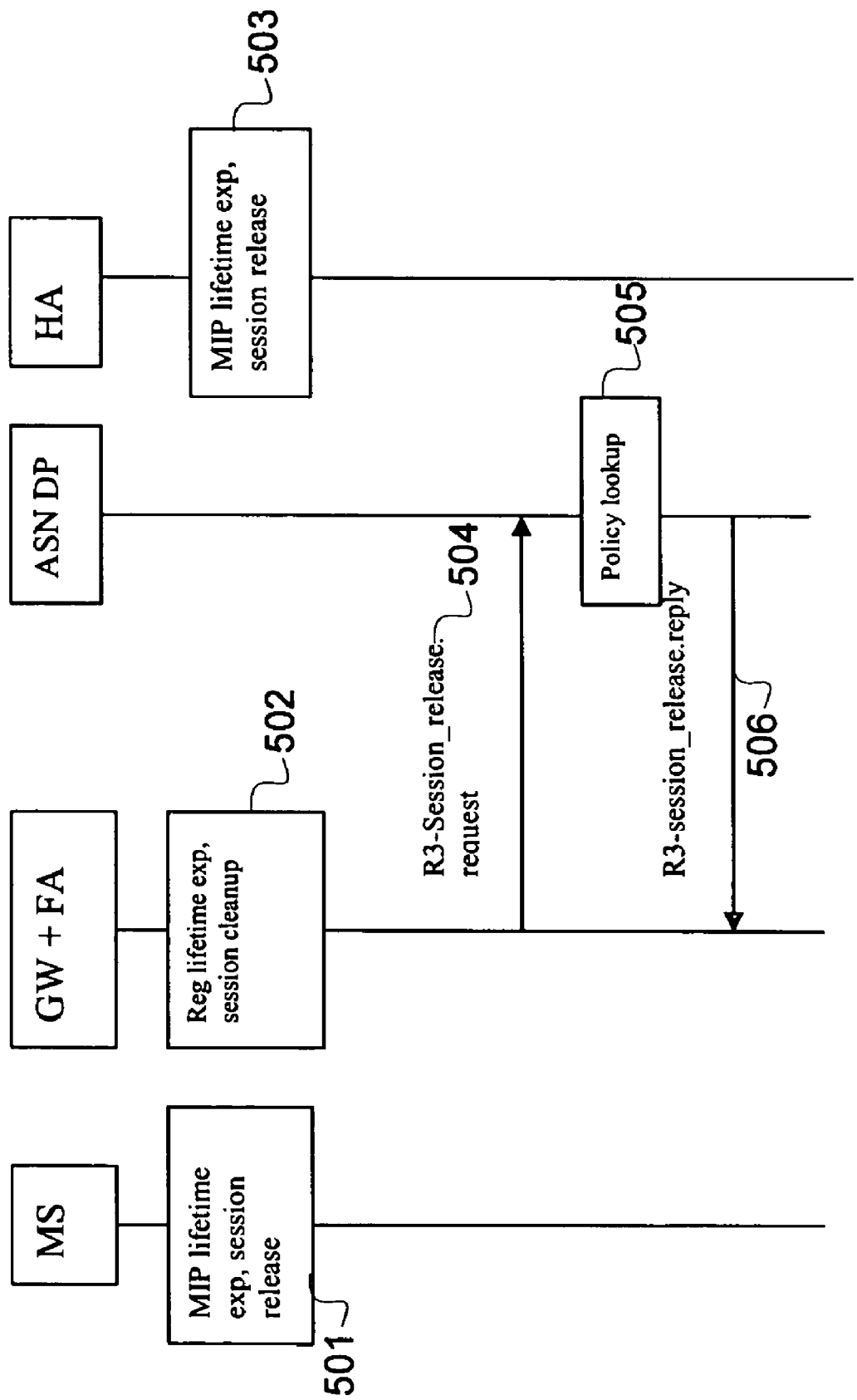
FIG. 5 is a simplified diagram illustrating an embodiment of the present invention.

FIG. 5 is a simplified diagram illustrating an embodiment of the present invention. This diagram is merely an example, which should not unduly limit the scope of the claims. One of ordinary skill in the art would recognize many variations, alternatives, and modifications. For example, various steps illustrated in FIG. 5 may be added, removed, replaced, repeated, overlapped, and/or partially overlapped.

As seen in FIG. 5, network operations is illustrated with a mobile station, a foreign agent, a decision point, and a home agent. For example, the foreign agent is associated with a gateway of an ASN. As another example, the decision is a logic component of the ASN. As merely an example, the home agent is a part of a CSN.

According to certain embodiments, these entities are compatible with existing techniques and network standards. For example, the mobile station is configured to periodically send MIP registration message to the foreign agent to update lifetime associated with the mobile station. The mobile station, the foreign agent, and the home agent each maintains stores the lifetime associated with the connection of the mobile station. According to various embodiments, both the mobile station and the home agent terminate the connection session of the mobile station when the lifetime of the connection expires.

As an example, if the mobile station has good connection with network, it periodically send MIP registration messages to the home agent through the foreign agent before the current lifetime expires. For example, each of the MIP registration message provides a new lifetime and renews the MIP.

When the mobile station loses connection for a predetermine determined period time, the previous sent lifetime, which is stored by both the home agent and the foreign agent, expires. For example, at step 502 shown in FIG. 5, the foreign agent determines that the mobile station is no longer active if a re-registration message is not received from the mobile station before the lifetime expires. For example, the mobile station is abruptly disconnected from the network and/or is not operating properly.

At step 504, the foreign agent sends a session release request to the decision point. For example, the session release request is to free network resources that are deemed no longer needed. According to a specific embodiment, the foreign agent releases a MIP session from its own list and sends-session-release request and/or DataPath-deregistration-request to the decision point to indicate the expiration of mobile station connection, and requests the network resource be released.

At step 505, the decision point determines a policy that is associated with the connection and/or the mobile station in response to the session release request. For example, the decision point determines that in the absence of a new registration request from the mobile station, the mobile station is to be disconnected from the network.

At step 506, the decision point sends a session release reply to the foreign agent. based on the session release reply, the foreign agent disconnects the mobile station from the network and releases network resources allocated to the mobile station. As an example, network resources include bandwidth, memory, software processing, etc.

Figure 6:
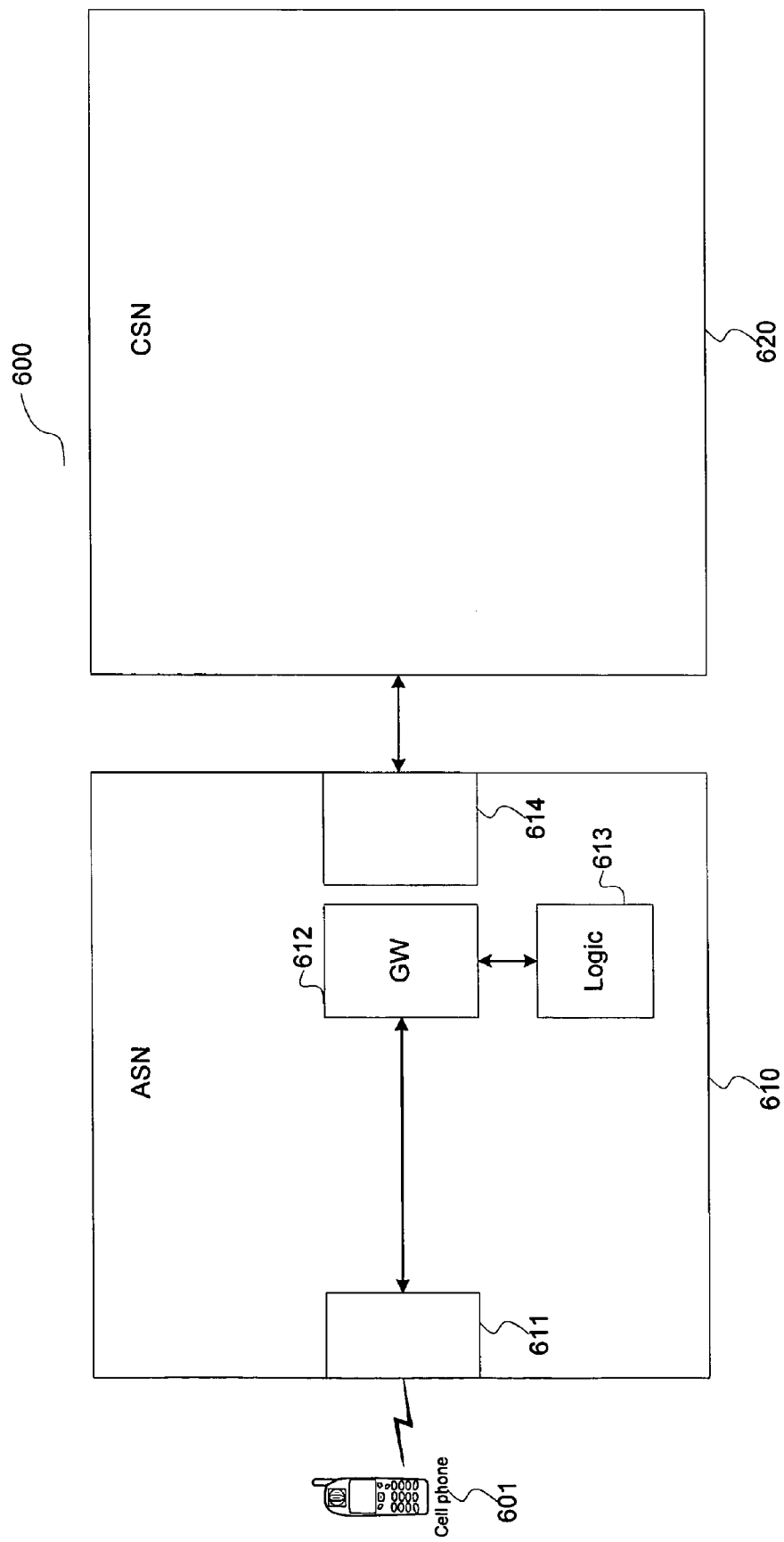
FIG. 6 is a simplified diagram illustrating a telecommunication system according to an embodiment of the present invention.

FIG. 6 is a simplified diagram illustrating a telecommunication system according to an embodiment of the present invention. This diagram is merely an example, which should not unduly limit the scope of the claims. One of ordinary skill in the art would recognize many variations, alternatives, and modifications.

As shown in FIG. 6, an embodiment of the present invention provides a telecommunication system 600 for wireless access. The system 600 includes a mobile station 601, an access service network 610, and a connectivity service network 620.

According to an embodiment, the mobile station 601 is configured to send registration messages at predetermined time intervals. For example, the registration message is in compliance with WiMAX standard. Each of the registration messages includes, among other things, a lifetime.

The access service network 610 is configured to provide a network access to the mobile station 601 and to wirelessly receive the registration messages from the mobile station 601. According to an embodiment, the access service network includes a base station that is configured to provide a radio access to the mobile station 601.

According to certain embodiments, the access service network 610 includes a communication interface 611, a communication interface 614, a logic component 613, and a gateway 612. The communication interface 611 is configured to wirelessly connect to one or more mobile stations. For example, the communication interface 611 includes a base station. The communication interface 614 is configured to connect to the connectivity service network 620. The logic component 613 is configured to store and determine one or more network policies associated with mobile stations. The gateway component is configured to store and to track at lifetimes of mobile stations. As an example, the communication interface 611 is configured to receive information associated with lifetimes from the mobile station 601. The gateway component 612 is configured to terminate a network connection for the at least one mobile station if the lifetime expires.

In a specific embodiment, the connectivity service network 620 is configured to receive the registration messages and store at the lifetimes. For example, the connectivity service network allocates a network resource for the mobile station in response to the registration messages.

Figure 7:
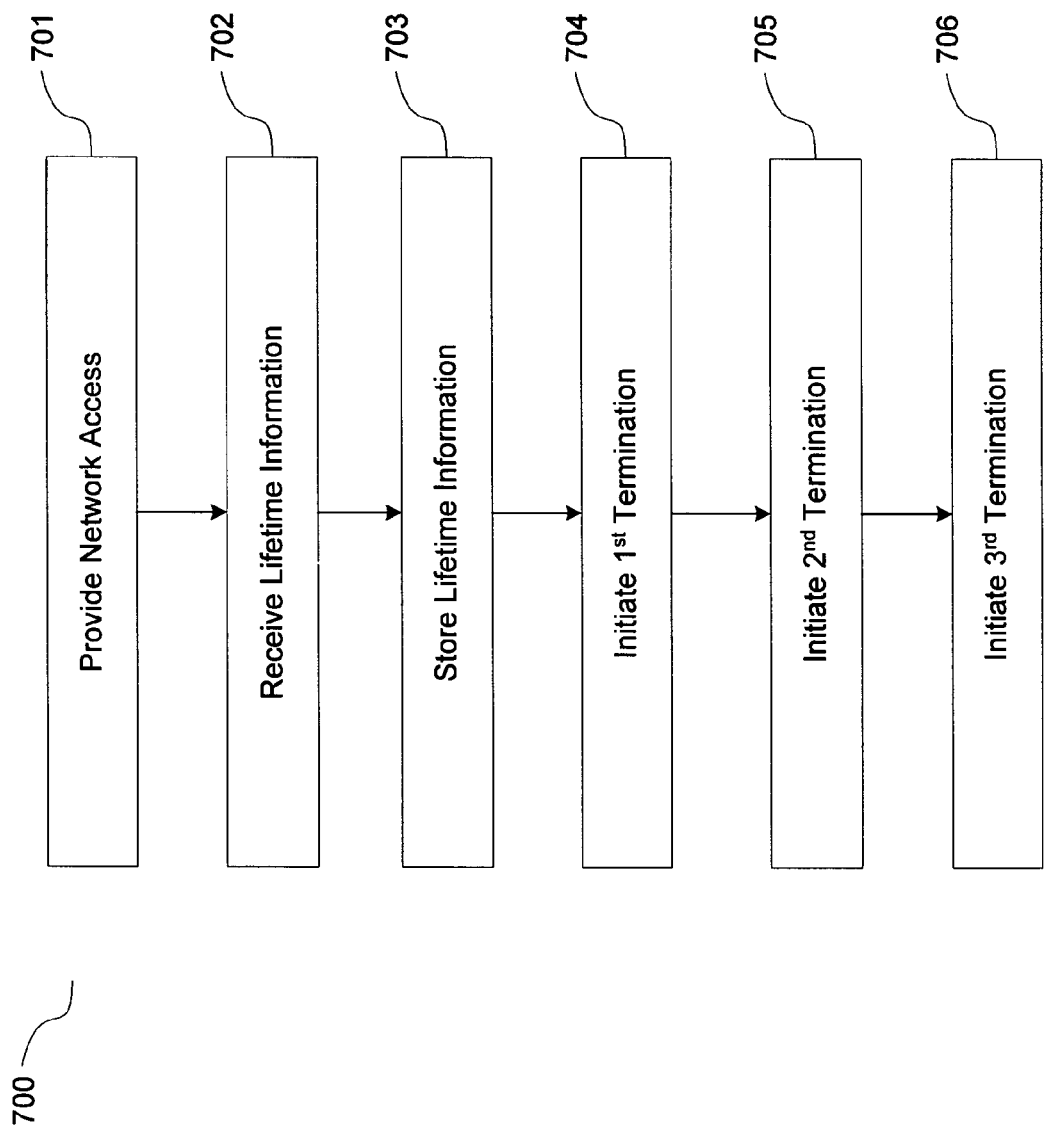
FIG. 7 is a simplified diagram illustrating operation of a telecommunication system according to an embodiment of the present invention.

FIG. 7 is a simplified diagram illustrating operation of a telecommunication system according to an embodiment of the present invention. This diagram is merely an example, which should not unduly limit the scope of the claims. One of ordinary skill in the art would recognize many variations, alternatives, and modifications. For example, various steps illustrated in FIG. 5 may be added, removed, replaced, repeated, overlapped, and/or partially overlapped.

As an example, the operation described in FIG. 7 describes a method for managing resource in a wireless network. For example, the wireless network includes an access network and a home network. The access network provides, among other things, radio connectivity and the home network provides internet protocol and other types of connectivity.

At step 701, network access is provided to a mobile station by the access network. According to certain embodiments, the network access includes a network connection between the mobile station and the home network.

At step 702, information associated with a lifetime for the network access from the mobile station is received by the access network and by the home network. For example, the information is encapsulated in a registration message compliant with WiMAX standard.

At step 703, the information associated with the lifetime is stored by the access network and by the home network.

At step 704, a first termination process for the network connection is initiated by the home network if the lifetime expires. For example, the lifetime expires when the mobile station fails to send a re-registration message.

At step 705, a second termination process for the network connection is initiated by the mobile station if the lifetime expires. For example, the lifetime expires for the mobile station when the mobile station is unable to send a re-registration message to the network.

At step 706, a third termination process for the network connection is initiated by the access network if the lifetime expires. For example, the initiating a third termination process is performed without the access network communicating with the home network about the third termination process.

It is to be appreciated that the various embodiments of the present invention provide advantages over conventional techniques. In various embodiments, the present invention allows valuable network resources to be allocated for better use. For example, an access network is able to terminate a network connection to a mobile station independently and effectively. In addition, various embodiments of the present invention are compatible with conventional techniques and easily implemented. There are other benefits as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An access network system for a wireless communication network comprising:
   a first communication interface configured to maintain a mobile internet protocol (MIP) session with a mobile station, the first communication interface being configured to receive a re-registration message having a lifetime from the mobile station;
   a second communication interface configured to connect to a home agent located outside the access network system;
   a logic component configured to store and determine a network policy associated with the mobile station, the network policy including information relating to a termination of the MIP session in the absence of a re-registration request from the mobile station; and
   a gateway component configured to store and to track a time of the MIP session, wherein the gateway component is configured to initiate a termination of the MIP session with the mobile station without any approval from the mobile station or a home network of the mobile station if the re-registration message is not received before the time of the MIP session exceeds the lifetime received from the mobile station, and wherein the gateway component is configured to maintain the MIP session with the mobile station if the re-registration message is received before the time of the MIP session exceeds the lifetime received from the mobile station.

2. The system of claim 1 wherein the termination of the MIP session with the mobile station comprises causing a deallocation of network resources.

3. The system of claim 1 wherein the gateway component comprises a foreign agent.

4. The system of claim 1 wherein the first communication interface comprises a base station.

5. The system of claim 1 wherein the home agent is a part of a connectivity service network.

6. The system of claim 5 wherein the connectivity service network stores a user profile for the mobile station.

7. The system of claim 1 wherein the system is compatible with WiMAX standard.

8. The system of claim 1 wherein the re-registration message comprises a mobile internet protocol identifier.

* * * * *